US012755669B2

(12) United States Patent
Lee et al.

(10) Patent No.: US 12,755,669 B2
(45) Date of Patent: Oct. 6, 2026

(54) POWER SUPPLY, ELECTRONIC DEVICE INCLUDING THE SAME, AND METHOD OF DRIVING THE SAME

(71) Applicant: Samsung Display Co., Ltd., Yongin-Si (KR)

(72) Inventors: Dae Sik Lee, Yongin-si (KR); Myeong Su Kim, Yongin-si (KR); Sang Hyun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/341,805

(22) Filed: Sep. 26, 2025

(65) Prior Publication Data

US 2026/0134812 A1 May 14, 2026

(30) Foreign Application Priority Data

Nov. 14, 2024 (KR) ........................ 10-2024-0162262

(51) Int. Cl.

*G09G 3/20* (2006.01)
*G05F 1/565* (2006.01)
*G05F 1/575* (2006.01)
*H02M 3/158* (2006.01)

(52) U.S. Cl.

CPC ........... *G09G 3/2092* (2013.01); *G05F 1/565* (2013.01); *G05F 1/575* (2013.01); *G09G 2310/0267* (2013.01); *G09G 2310/0275* (2013.01); *G09G 2310/08* (2013.01); *G09G 2330/028* (2013.01); *H02M 3/158* (2013.01)

(58) Field of Classification Search

CPC ......... G09G 3/2092; G09G 2310/0267; G09G 2310/0275; G09G 2310/08; G09G 2330/028; G09G 3/20; G05F 1/565; G05F 1/575; H02M 3/158; H02M 1/08; H02M 3/156; H02M 1/0006; H02M 1/0025

See application file for complete search history.

(56) References Cited

U.S. PATENT DOCUMENTS 10,008,152 B2 6/2018 Jang et al.
10,186,960 B2 1/2019 Lee et al.
11,594,963 B2 * 2/2023 Namekawa ........... H02M 3/158

(Continued)

FOREIGN PATENT DOCUMENTS

KR 10-2276246 B1 7/2021
KR 10-2452518 B1 10/2022

*Primary Examiner* — Vinh T Lam
(74) *Attorney, Agent, or Firm* — Innovation Counsel LLP

(57) ABSTRACT

A power supply is disclosed that includes a comparison unit and an internal voltage divider circuit. A voltage conversion circuit generates an output voltage and provides the output voltage to an output terminal. A feedback terminal is electrically connected to the output terminal and to an input node to which a first feedback voltage is applied. The comparison unit compares a voltage applied to the input node with a reference voltage, outputs a feedback control signal of a first level during a discharge period preceding a sensing period, and outputs the feedback control signal of the first level or a second level during the sensing period. The internal voltage divider circuit divides the first feedback voltage into a second feedback voltage in response to the feedback control signal of the first level.

20 Claims, 13 Drawing Sheets

(56) References Cited

U.S. PATENT DOCUMENTS

| | | | | |
|---|---|---|---|---|
| 11,689,102 | B2 * | 6/2023 | Chakkirala | H02M 1/0019<br>323/271 |
| 11,848,608 | B2 * | 12/2023 | Chang | H02M 1/0006 |
| 2016/0329734 | A1 * | 11/2016 | Lee | H02M 3/156 |
| 2019/0115841 | A1 * | 4/2019 | Maruyama | H02M 3/33523 |
| 2021/0083574 | A1 * | 3/2021 | Namekawa | H02M 3/156 |
| 2022/0271659 | A1 * | 8/2022 | Park | H02M 1/0009 |
| 2023/0412077 | A1 * | 12/2023 | Oshita | H02M 1/0025 |

* cited by examiner

<Case 2>

FIG. 6

<Truth Table of SR Latch>

600

| S | R | Q |
|---|---|---|
| L | L | Hold output |
| L | H | L |
| H | L | H |
| H | H | Undefined |

<Case 1>

<Case 2>

POWER SUPPLY, ELECTRONIC DEVICE INCLUDING THE SAME, AND METHOD OF DRIVING THE SAME

CROSS-REFERENCE TO RELATED APPLICATION

This application claims priority under 35 U.S.C. § 119(a) to Korean Patent Application No. 10-2024-0162262, filed on Nov. 14, 2024, in the Korean Intellectual Property Office, the disclosure of which is incorporated by reference herein in its entirety.

BACKGROUND

(a) Technical Field

Various embodiments of the present disclosure relate to a power supply, an electronic device including the same, and a method of driving the same.

(b) Description of Related Art

As information technology has developed, the importance of display devices, which are connection mediums between users and information, has been highlighted. Accordingly, the use of display devices such as liquid crystal display devices, an organic light emitting display devices, and the like has been increasing.

These display devices include a power supply that converts external voltages to generate voltages needed to drive the display devices.

SUMMARY

Various embodiments of the present disclosure provide a power supply capable of removing an induced voltage, an electronic device including the power supply, and a method of driving the power supply.

One or more embodiments of the present disclosure may provide a power supply that includes: an output terminal to output an output voltage; a voltage conversion circuit configured to generate the output voltage corresponding to a duty ratio of a first switching control signal; a feedback terminal electrically connected to the output terminal and electrically connected to an input node to which a first feedback voltage is applied; a current supply configured to provide a predetermined reference current to the input node in response to a current supply signal of a turn-on level which is input during a sensing period; a comparison unit configured to compare a voltage applied to the input node with a reference voltage, to output a feedback control signal of a first level during a discharge period preceding the sensing period, and to output the feedback control signal of the first level or a second level during the sensing period; an internal voltage divider circuit configured to electrically connect the input node and a ground power source in response to the feedback control signal of the first level, and to divide the first feedback voltage into a second feedback voltage in response to the feedback control signal of the first level; and a voltage controller configured to adjust the duty ratio of the first switching control signal in response to the second feedback voltage.

In one or more embodiments, the current supply may include a current source connected to a driving power and configured to generate the predetermined reference current, and a control transistor connected between the current source and the input node and controlled in response to the current supply signal.

In one or more embodiments, the control transistor may include an N-type semiconductor.

In one or more embodiments, the predetermined reference current may be 1 mA.

In one or more embodiments, the internal voltage divider circuit may include a first resistor connected between the input node and the voltage controller; a first internal transistor connected between the input node and the voltage controller, and turned on in response to the feedback control signal of the second level; a second resistor; and a second internal transistor. The second resistor and the second internal transistor may be connected in series between the input node and the ground power source. The second internal transistor may be turned on alternately to the first internal transistor.

In one or more embodiments, the internal voltage divider circuit may further include a first inverter configured to invert a phase of the feedback control signal. The second internal transistor includes a gate electrode electrically connected to an output terminal of the first inverter.

In one or more embodiments, each of the first internal transistor and the second internal transistor may include an N-type semiconductor.

In one or more embodiments, the first internal transistor may include an N-type semiconductor, and the second internal transistor may include a P-type semiconductor.

In one or more embodiments, the comparison unit may include a comparator that includes a power terminal to which the current supply signal is input, and that outputs a signal of a low level or a high level based on a result of comparing the reference voltage with the first feedback voltage; a second inverter configured to invert a phase of an Under Voltage Lock Out (UVLO) signal; and an SR latch. The SR latch may include an S input terminal electrically connected to an output terminal of the comparator; an R input terminal electrically connected to an output terminal of the second inverter; and a Q output terminal that outputs the feedback control signal according to a predetermined truth table based on a result of comparing an input to the S input terminal with an input to the R input terminal.

In one or more embodiments, the comparator may include an inverting input terminal supplied with the reference voltage, and a non-inverting input terminal supplied with the first feedback voltage.

In one or more embodiments, the comparator may output the signal of the low level during the discharge period during which the current supply signal of a turn-off level is supplied.

In one or more embodiments, the comparator may output, during the sensing period during which the current supply signal of the turn-on level is supplied, the signal of the low level when the first feedback voltage is smaller than the reference voltage, and the signal of the high level when the first feedback voltage is greater than the reference voltage.

In one or more embodiments, the voltage conversion circuit may include a charging transistor connected between a first node and an input terminal, to which an input voltage is input, and controlled in response to the first switching control signal; a resistor connected to the ground power source; a discharging transistor connected between the first node and the resistor and controlled in response to a second switching control signal; a diode connected between the first node and the ground power source; and an inductor connected between the first node and the output terminal.

In one or more embodiments, the second switching control signal may have the turn-on level during the discharge period, and may have a turn-off level during the sensing period.

In one or more embodiments, the first switching control signal may have a turn-off level during the discharge period and the sensing period.

In one or more embodiments, the power supply may further include an external voltage divider circuit connected to the input terminal and the output terminal and including a plurality of external resistors.

In one or more embodiments, the external voltage divider circuit may include a first external resistor connected between the output terminal and the feedback terminal; and a second external resistor connected between the first external resistor and the ground power source.

One or more embodiments of the present disclosure may provide a method of driving a power supply that includes: turning on, during a discharge period, a first discharge switching element electrically connected to a feedback terminal; applying, during a sensing period after the discharge period, a reference current to an input node electrically connected to the feedback terminal; comparing a first feedback voltage of the input node with a reference voltage; and determining whether an external resistor is connected to the feedback terminal according to a result of comparing the first feedback voltage of the input node with the reference voltage.

In one or more embodiments, the method may further include turning on, during the discharge period, a second discharge switching element electrically connected to an output terminal. The feedback terminal and the output terminal may be electrically connected to each other.

One or more embodiments of the present disclosure may provide an electronic device that includes: a power supply converting an input voltage to generate a plurality of output voltages; a data driver receiving one of the plurality of output voltages and generating a data voltage; a scan driver receiving one of the plurality of output voltages and generating a scan signal; and a display panel in which a plurality of pixels, to which the data voltage and the scan signal are applied, are arranged. The power supply may include an output terminal to output an output voltage; a voltage conversion circuit configured to generate the output voltage corresponding to a duty ratio of a first switching control signal; a feedback terminal electrically connected to the output terminal and electrically connected to an input node to which a first feedback voltage is applied; a current supply configured to provide a reference current to the input node in response to a current supply signal of a turn-on level which is input during a sensing period; a comparison unit configured to compare a voltage applied to the input node with a reference voltage, to output a feedback control signal of a first level during a discharge period preceding the sensing period, and to output the feedback control signal of the first level or a second level during the sensing period; an internal voltage divider circuit configured to electrically connect the input node and a ground power source in response to the feedback control signal of the first level, and to divide the first feedback voltage into a second feedback voltage in response to the feedback control signal of the first level; and a voltage controller configured to adjust the duty ratio of the first switching control signal in response to the second feedback voltage.

BRIEF DESCRIPTION OF THE DRAWINGS

FIG. 6 is a truth table for an SR latch in FIG. 5.

DETAILED DESCRIPTION

Figure 1:
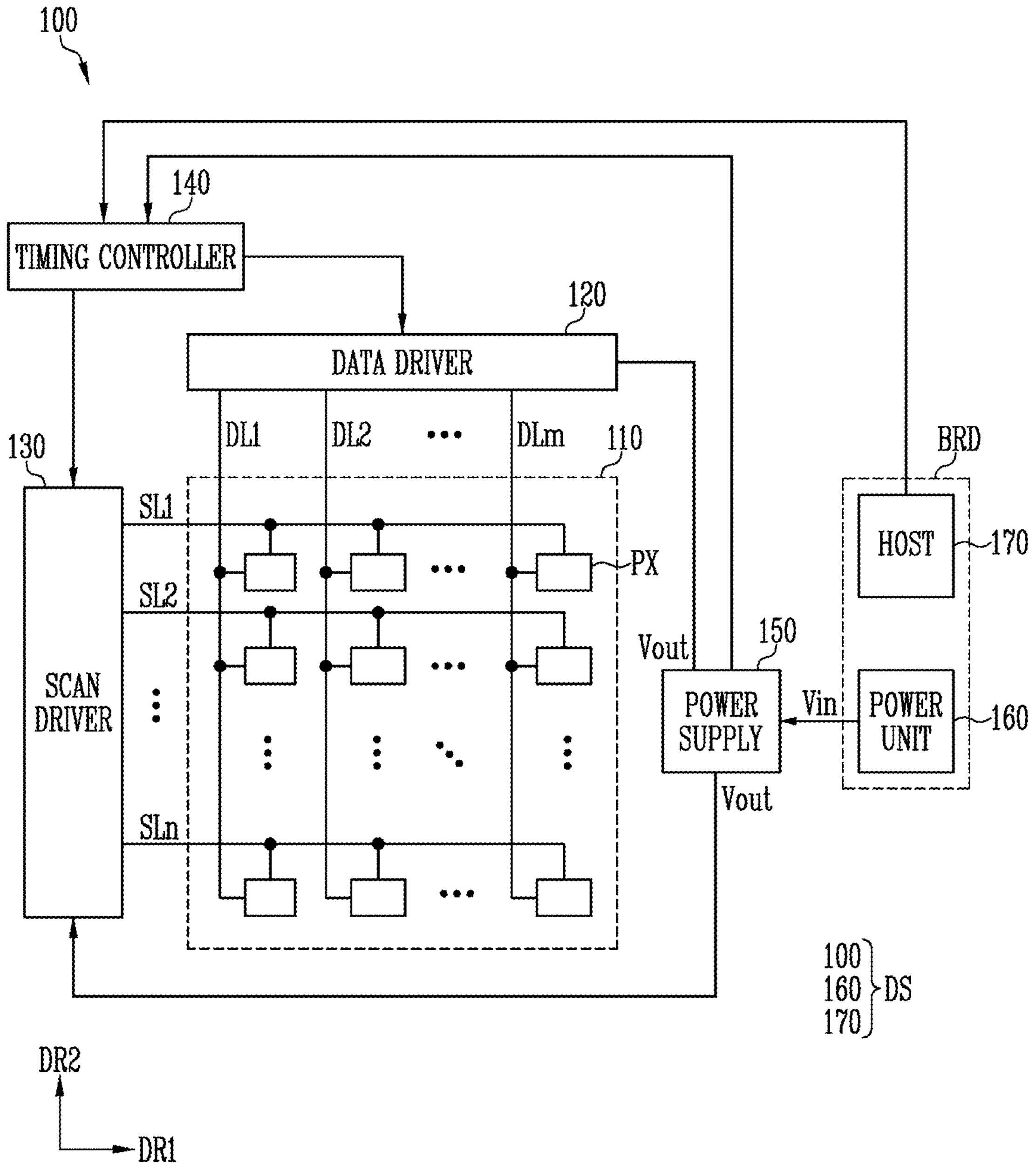
FIG. 1 is a system block diagram illustrating an electronic device including a power supply according to embodiments of the present disclosure.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thickness of each component are arbitrarily represented for the sake of explanation, and the present disclosure is not limited to what is illustrated in the drawings. In the drawings, the thickness of each component may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

While terms such as "first" and "second" may be used to describe various components, such components should not be understood as being limited to the above terms. The above terminologies are used to distinguish one component from the other component, for example, a first component may be referred to as a second component without departing from the scope in accordance with the concept of the present disclosure and similarly, a second component may be referred to as a first component. Singular forms in the present disclosure are intended to include plural forms as well, unless the context clearly indicates otherwise.

Terms such as "under", "at a lower portion", "above", "at an upper portion", and the like may be used to describe a relationship of components shown in the drawings. These terms are relative and are described with reference to a direction depicted in the drawings.

So far as not being differently defined, all terms used herein including technical or scientific terminologies have meanings that they are commonly understood by those skilled in the art to which the present disclosure pertains. The terms defined in generally used dictionaries should be construed as having the same meanings as would be construed in the context of the related art, and unless clearly defined otherwise in this specification, should not be construed as having idealistic or overly formal meanings.

In the present specification, it should be understood that terms "comprise," "include," and "have" indicate that a feature, a number, a step, an operation, a component, a part, or the combination thereof described in the specification is present, but do not exclude a possibility of presence or addition of one or more other features, numbers, steps, operations, components, parts, or combinations thereof, in advance.

It is also noted that in embodiments of the present disclosure, "connected" is not limited to physical or mechanical connections. For example, even if two objects are not directly connected, they can be referred to as including being connected to each other in a circuit through an electrical connection.

Hereinafter, various embodiments of the present disclosure are described in detail with reference to the accompanying drawings.

FIG. 1 is a system block diagram illustrating an electronic device DS including a power supply 150 according to embodiments of the present disclosure.

Referring to FIG. 1, the electronic device DS according to embodiments of the present disclosure may include a display device 100, a power unit 160, a host 170, and the like.

The display device 100, according to embodiments of the present disclosure, may include a display panel 110, a data driver 120, a scan driver 130, a timing controller 140, and a power supply 150.

In the display panel 110, a plurality of pixels PX may be arranged. Each of the plurality of pixels PX may be supplied with a scan signal via a corresponding one of a plurality of scan lines SL1 to SLn (where n is an integer of 2 or more). Each of the plurality of pixels PX may be supplied with a data signal (or a data voltage) via a corresponding one of a plurality of data lines DL1 to DLm (where m is an integer of 2 or more).

The data driver 120 (or, a data driving circuit 120) may generate a data signal under control of the timing controller 140 and supply the generated data signal to the pixels PX via the data lines DL1 to DLm.

The scan driver 130 (or, a scan driving circuit 130) may generate a scan signal under control of the timing controller 140 and supply the generated scan signal to the pixels PX via the plurality of scan lines SL1 to SLn.

The timing controller 140 may receive various signals (e.g., image data, a control signal, or the like) from the host 170. The timing controller 140 may control the data driver 120, the scan driver 130, the power supply 150, and the like based on the various signals supplied by the host 170. In an embodiment, the timing controller 140 may be provided as a circuit such as a processor, logic, or the like. The timing controller 140 may include one or more memories (e.g., buffer memory, or the like).

The power supply 150 (or a power supply circuit 150) can provide a voltage used to drive the display device 100. For example, the power supply 150 may convert an externally input input voltage Vin to an output voltage Vout and supply the output voltage Vout to at least one of the data driver 120, the scan driver 130, or the timing controller 140. Further, in accordance with an embodiment, the power supply 150 may supply the output voltage Vout to the display panel 110. In an embodiment, the power supply 150 may include a Power Management Integrated Circuit (PMIC).

The power unit 160 can provide the input voltage Vin. For example, the power unit 160 may include a battery to provide a direct current power or a rectifier to convert an alternating current power to a direct current power and output the direct current power. However, embodiments of the present disclosure are not limited thereto.

The host 170 may be configured to control components of the electronic device DS, including the display device 100. For example, the host 170 may be a set-top box, an application processor (AP), or the like, but embodiments of the present disclosure are not limited thereto.

In an embodiment, the power unit 160 and the host 170 may be mounted on a board BRD. The host 170 and the timing controller 140 may be connected via a predetermined interface. For example, the interface may be a Serial Programming Interface (SPI), an Inter Integrated Circuit (I2C), a Mobile Industry Processor Interface (MIPI), or the like. However, embodiments of the present disclosure are not limited thereto.

Referring to FIG. 1, the host 170 and the timing controller 140 are connected, and the timing controller 140 and the power supply 150 are connected. Accordingly, while the host 170 is driven, the power supply 150 may be applied with an induced voltage induced by the host 170 in addition to the input voltage Vin applied from the power unit 160. When the induced voltage is applied to the power supply 150, the level of the output voltage Vout may be different from an intended level, which may degrade the display quality of the display device 100.

Hereinafter, embodiments of the present disclosure for mitigating or eliminating the influence of an induced voltage are described in detail.

Figure 2A:
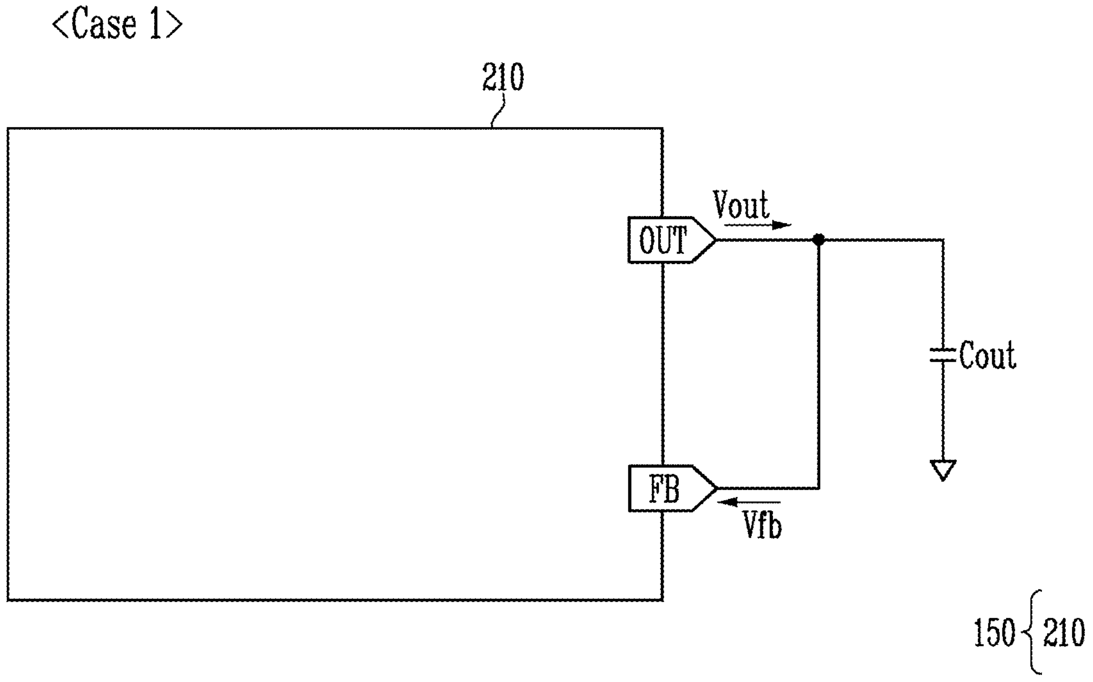
FIG. 2A illustrates an embodiment in which a power supply does not include an external voltage divider circuit.
Figure 2B:
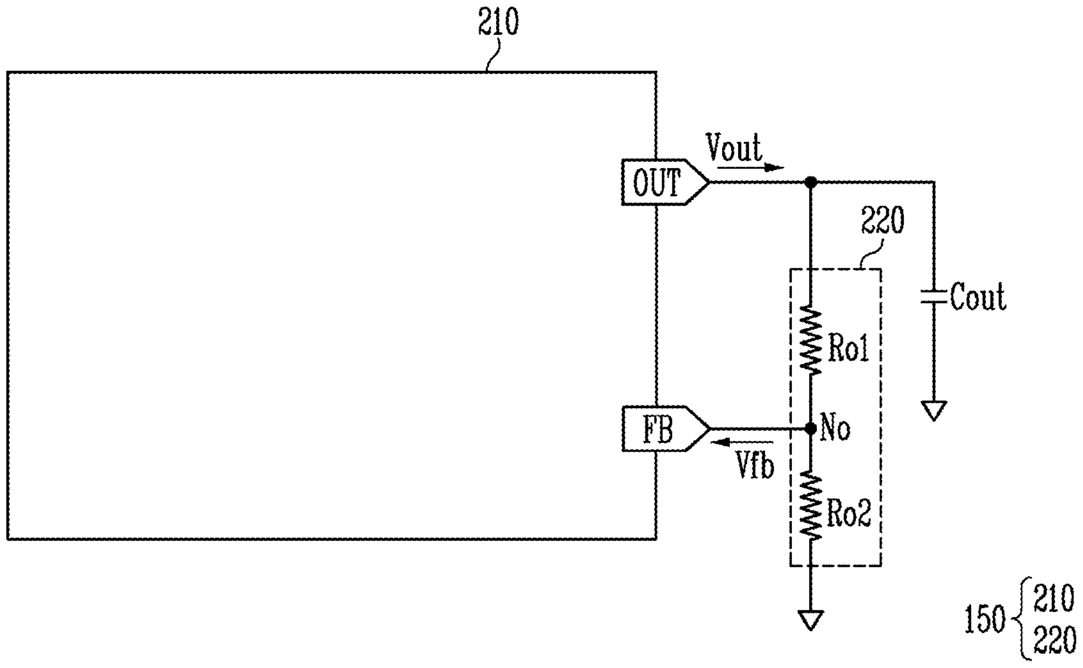
FIG. 2B illustrates an embodiment in which a power supply includes an external voltage divider circuit.

FIG. 2A illustrates an embodiment in which the power supply 150 does not include an external voltage divider circuit. FIG. 2B illustrates an embodiment in which the power supply 150 includes an external voltage divider circuit 220.

Referring to FIGS. 2A and 2B, the power supply 150 according to embodiments of the present disclosure may include a power output circuit 210.

The power output circuit 210 may include an output terminal OUT and a feedback terminal FB.

The output terminal OUT may output the output voltage Vout. In an equivalent circuit diagram, a capacitor Cout may be located to maintain the output voltage Vout.

A feedback voltage Vfb may be input to the feedback terminal FB.

Referring to FIG. 2A, the output terminal OUT and the feedback terminal FB may be electrically connected to each other without passing through an external voltage divider circuit. Accordingly, the output voltage Vout and the feedback voltage Vfb may be substantially the same.

Referring to FIG. 2B, the output terminal OUT and the feedback terminal FB may be electrically connected to each other via the external voltage divider circuit 220. Accordingly, the output voltage Vout may be divided by the external voltage divider circuit 220 and input to the feedback terminal FB as the feedback voltage Vfb.

The external voltage divider circuit 220 may include a plurality of external resistors Ro1 and Ro2 in series with each other. For example, the external voltage divider circuit 220 may include a first external resistor Ro1 and a second external resistor Ro2. The first external resistor Ro1 may be connected between the output terminal OUT and a node No. The second external resistor Ro2 may be connected between the node No and a ground power source. The feedback terminal FB may be connected to the node No.

Figure 3:
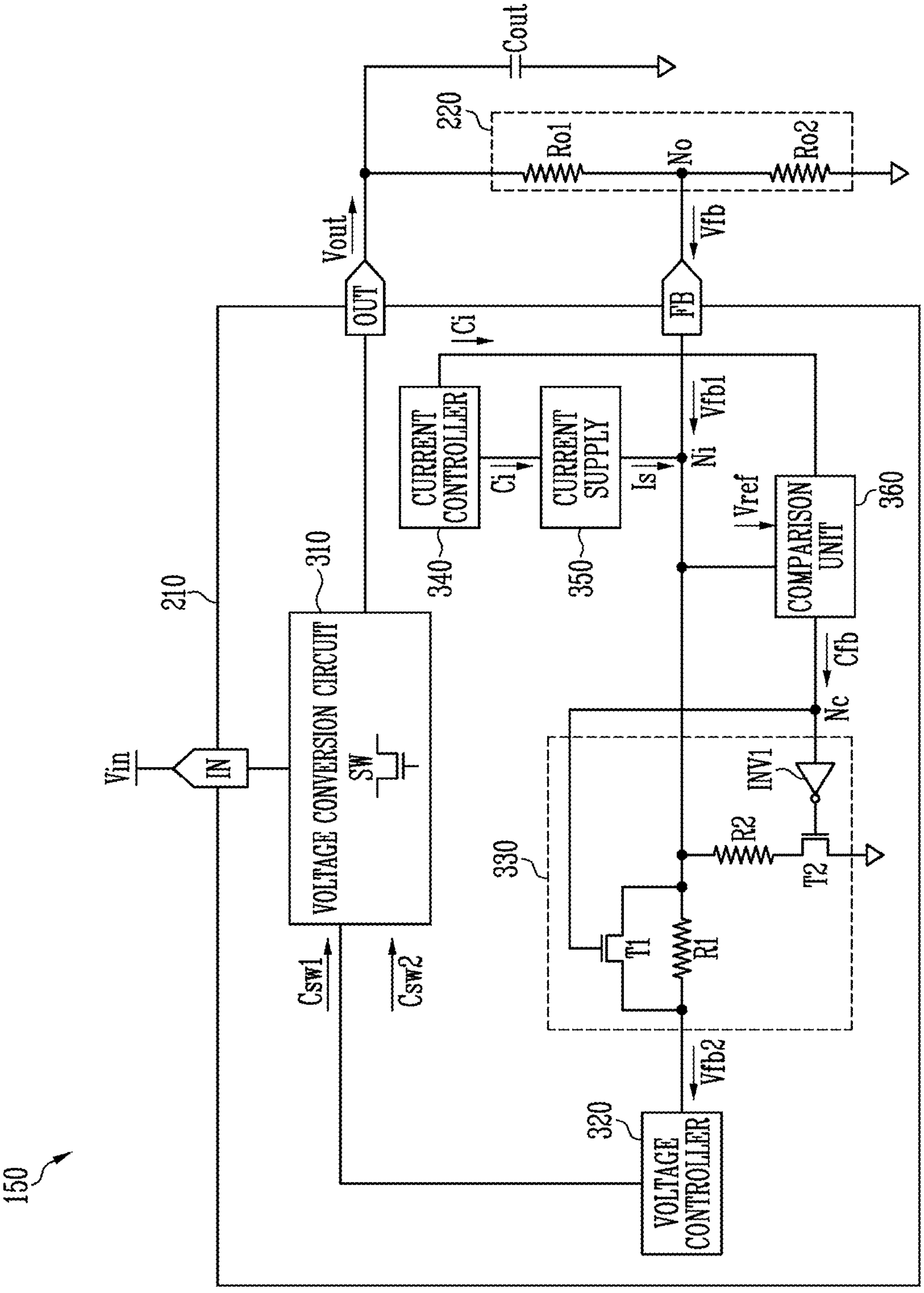
FIG. 3 is a more detailed diagram of an embodiment of a power output circuit.

FIG. 3 is a more detailed diagram of an embodiment of the power output circuit 210.

Referring to FIG. 3, the power output circuit 210 may include a voltage conversion circuit 310, a voltage controller 320, an internal voltage divider circuit 330, a current controller 340, a current supply 350, and a comparison unit 360.

The voltage conversion circuit 310 may convert the input voltage Vin to the output voltage Vout and output the output voltage Vout. In an embodiment, the voltage conversion circuit 310 may be configured to remove an induced voltage applied to the output terminal OUT. In an embodiment, the input voltage Vin may be input to the voltage conversion circuit 310 via an input terminal IN of the power output circuit 210. The output voltage Vout may be output to the outside via the output terminal OUT of the voltage conversion circuit 310.

The voltage conversion circuit 310 may include at least one switching element SW for performing a voltage conversion operation. The switching element SW of the voltage conversion circuit 310 may be controlled according to a first switching control signal Csw1 and a second switching control signal Csw2. In an embodiment, the switching element SW may be a transistor. The first switching control signal Csw1 may be output from the voltage controller 320. The second switching control signal Csw2 may be output from the aforementioned host 170 (see FIG. 1).

The voltage conversion circuit 310 may be a converter including at least one switching element SW. For example, the voltage conversion circuit 310 may be a buck converter. However, embodiments of the present disclosure are not limited thereto, and the voltage conversion circuit 310 may be a boost converter, a buck-boost converter, or the like. By way of example, an embodiment in which the voltage conversion circuit 310 according to embodiments of the present disclosure is a buck converter is described below as an example, but embodiments of the present disclosure are not limited thereto.

The voltage controller 320 may be configured to control the voltage conversion circuit 310. For example, the voltage controller 320 may control the voltage conversion circuit 310 in response to a second feedback voltage Vfb2 provided via the internal voltage divider circuit 330. The voltage controller 320 can control the duty ratio of the switching element SW included in the voltage conversion circuit 310 by comparing the second feedback voltage Vfb2 with a preset comparison voltage, and controlling the pulse width of the first switching control signal Csw1 in response to the comparison result. Accordingly, the voltage controller 320 may adjust the level of the output voltage Vout by reflecting the second feedback voltage Vfb2.

The internal voltage divider circuit 330 can provide the second feedback voltage Vfb2. For example, the internal voltage divider circuit 330 may use a first feedback voltage Vfb1 to generate the second feedback voltage Vfb2.

The internal voltage divider circuit 330 may include a plurality of internal resistors R1 and R2 and a plurality of internal transistors T1 and T2. The first internal transistor R1 and the first internal transistor T1 may be connected in parallel. The second internal transistor R2 and the second internal transistor T2 may be connected in series. In an embodiment, the internal voltage divider circuit 330 may further include a first inverter INV1. In an embodiment, the internal resistors R1 and R2 may include a first internal resistor R1 and a second internal resistor R2. In an embodiment, the plurality of internal transistors T1 and T2 may include a first internal transistor T1 and a second internal transistor T2.

The first internal resistor R1 may be connected between the voltage controller 320 and an input node Ni.

In an embodiment, the second internal resistor R2 may be connected between the input node Ni and the second internal transistor T2.

The first internal transistor T1 may be configured to switch an electrical connection between the voltage controller 320 and the input node Ni. The first internal transistor T1 may include a gate electrode connected to a control node Nc.

The second internal transistor T2 may be configured to switch an electrical connection between the second internal resistor R2 and the ground power source. The second internal transistor T2 may include a gate electrode connected to the first inverter INV1. In embodiments of the present disclosure, the second internal transistor T2 may be referred to as a first discharge switching element T2.

In an embodiment, the second internal transistor R2 may be connected between the second internal transistor T2 and the ground power source. In other words, the order of the second internal resistor R2 and the second internal transistor T2 between the input node Ni and the ground power source may be reversed from what is shown in FIG. 3.

The first inverter INV1 may be configured to invert the phase of a signal input to the control node Nc and output the signal with the inverted phase. An output terminal of the first inverter INV1 may be electrically connected to the gate electrode of the second internal transistor T2.

The first internal transistor T1 and the second internal transistor T2 can be alternately turned on and off. For example, during a period when the first internal transistor T1 is turned on, the second internal transistor T2 may be turned off. Conversely, during a period when the second internal transistor T2 is turned on, the first internal transistor T1 may be turned off.

In an embodiment, both the first internal transistor T1 and the second internal transistor T2 may be transistors including an N-type semiconductor. The transistor including the N-type semiconductor may be turned on in response to a signal of a high level which is applied to a gate electrode and turned off in response to a signal of a low level which is applied to the gate electrode.

However, embodiments of the present disclosure are not limited thereto, and both the first internal transistor T1 and the second internal transistor T2 may be transistors including a P-type semiconductor. The transistor including the P-type semiconductor may be turned on in response to a signal of a low level which is applied to a gate electrode and turned off in response to a signal of a high level which is applied to the gate electrode.

In an embodiment where the first internal transistor T1 and the second internal transistor T2 are transistors including the same type of semiconductor, a gate electrode of either the first internal transistor T1 or the second internal transistor T2 may be connected to an inverter.

However, embodiments of the present disclosure are not limited thereto, and in an embodiment in which the first internal transistor T1 and the second internal transistor T2 are transistors including different types of semiconductors, the inverter may be omitted.

By way of example, an embodiment in which each of the first internal transistor T1 and the second internal transistor T2 is a transistor including an N-type semiconductor is described below. However, embodiments of the present disclosure are not limited thereto.

In embodiments of the present disclosure, when the output terminal OUT and the feedback terminal FB are connected to the external voltage divider circuit 220 (see FIG. 2B), the first internal transistor T1 of the internal voltage divider circuit 330 may be turned on and the second internal transistor T2 of the internal voltage divider circuit 330 may be turned off. Accordingly, the output voltage Vout may be divided only by the external voltage divider circuit 220 and might not be further divided by the internal voltage divider circuit 330. Thus, the first feedback voltage Vfb1 may be substantially the same as the second feedback voltage Vfb2.

Conversely, when the output terminal OUT and the feedback terminal FB are not connected to the external voltage divider circuit 220 (see FIG. 2A), the first internal transistor T1 of the internal voltage divider circuit 330 may be turned off and the second internal transistor T2 of the internal voltage divider circuit 330 may be turned on. Accordingly, the first feedback voltage Vfb1, which is substantially the same as the output voltage Vout, may be divided by the internal voltage divider circuit 330. Thus, the second feedback voltage Vfb2 may be smaller compared to the first feedback voltage Vfb1.

The current controller 340 may supply a current supply signal Ci to the current supply 350 and the comparison unit 360.

The current supply 350 may supply a predetermined reference current Is to the feedback terminal FB. Depending on whether the external voltage divider circuit 220 is connected to the output terminal OUT and the feedback terminal FB, the voltage level at the input node Ni may be changed differently by the reference current Is. For example, when the external voltage divider circuit 220 is connected to the feedback terminal FB, a voltage of the input node Ni may be increased by a relatively large amount by the reference current Is. Conversely, when the feedback terminal FB is not connected to the external voltage divider circuit 220, the voltage of the input node Ni may be increased by a relatively small amount by the reference current Is.

The comparison unit 360 may compare the voltage of the input node Ni with a reference voltage Vref while the current supply signal Ci is input. The comparison unit 360 may output a feedback control signal Cfb based on the result of comparing the reference voltage Vref with the voltage of the input node Ni. The feedback control signal Cfb may be input to the control node Nc.

For example, when the voltage of the input node Ni is smaller than the reference voltage Vref, the comparison unit 360 may output a low-level feedback control signal Cfb. Thereby, the first internal transistor T1 may be turned off and the second internal transistor T2 may be turned on. The power supply 150 may operate in an internal resistance mode (or a first case).

Conversely, when the voltage of the input node Ni is greater than the reference voltage Vref, the comparison unit 360 may output a high-level feedback control signal Cfb. Thereby, the first internal transistor T1 may be turned on and the second internal transistor T2 may be turned off. The power supply 150 may operate in an external resistor mode (or a second case).

In the embodiment under discussion in which the first and second internal transistors T1 and T2 each include an N-type semiconductor, a low-level feedback control signal Cfb may be referred to as a feedback control signal of a first level and a high-level feedback control Cfb may be referred to as a feedback control signal of a second level. In an alternative embodiment in which the first and second internal transistors T1 and T2 each include a P-type semiconductor, a high-level feedback control signal may be referred to as a feedback control signal of a first level and a low-level feedback control signal may be referred to as a feedback control signal of a second level.

In embodiments of the present disclosure, the voltage conversion circuit 310, the voltage controller 320, the current controller 340, the current supply 350, and the comparison unit 360 may each be configured as a circuit.

Figure 4:
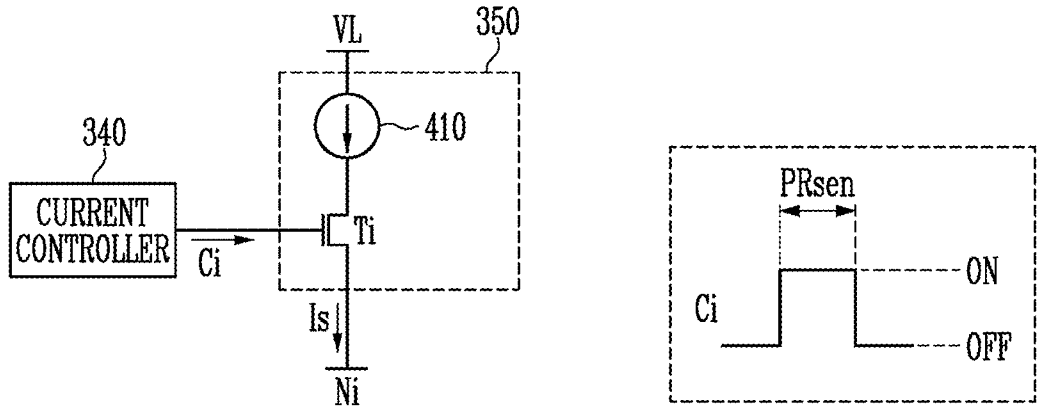
FIG. 4 is a more detailed diagram of a current supply.

FIG. 4 is a more detailed diagram of the current supply 350.

Referring to FIG. 4, the current supply 350 may include a current source 410 and a control transistor Ti.

The current source 410 may be configured to receive a driving power VL and provide the predetermined reference current Is. In an embodiment, the magnitude of the reference current Is may be about 1 mA (milliampere), but embodiments of the present disclosure are not limited thereto.

The control transistor Ti may be configured to switch an electrical connection between the current source 410 and the input node Ni. The control transistor Ti may include a gate electrode configured to receive the current supply signal Ci. The control transistor Ti may include the gate electrode electrically connected to the current controller 340. The control transistor Ti may electrically connect the current source 410 and the input node Ni in response to the current supply signal Ci of a turn-on level ON. When the control transistor Ti is supplied with the current supply signal Ci of a turn-off level OFF, the current source 410 and the input node Ni may be electrically isolated.

When the current source 410 and the input node Ni are electrically connected, the reference current Is may flow through the input node Ni.

The current controller 340 may output the current supply signal Ci having the turn-on level ON for a predetermined period of time. The period of time during which the current supply signal Ci has the turn-on level ON may be referred to as a sensing period PRsen.

In an embodiment, the length of the sensing period PRsen may be about 1 μs (microsecond), but embodiments of the present disclosure are not limited thereto.

In an embodiment, the control transistor Ti may be a transistor including an N-type semiconductor. In the above embodiment, the turn-on level ON of the current supply signal Ci may be a high level and the turn-off level OFF may be a low level. However, embodiments of the present disclosure are not limited thereto, and the control transistor Ti may be a transistor including a P-type semiconductor.

Figure 5:
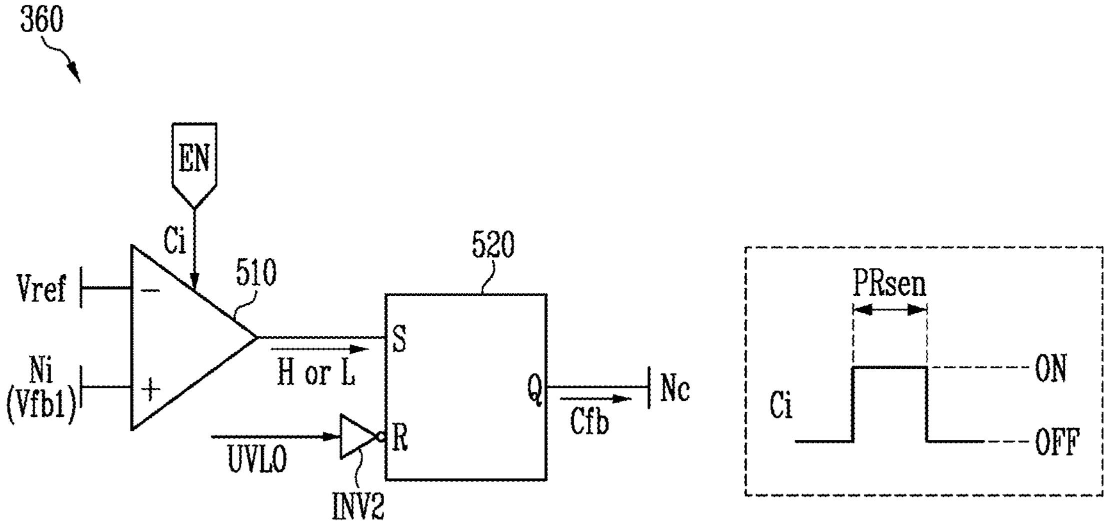
FIG. 5 is a more detailed diagram of a comparison unit.

FIG. 5 is a more detailed diagram of the comparison unit 360.

Referring to FIG. 5, the comparison unit 360 may include a comparator 510, a second inverter INV2, and an SR latch 520.

The comparator 510 may include a power terminal EN, an inverting input terminal "–", a non-inverting input terminal "+", and an output terminal.

The comparator 510 may compare the magnitude of a voltage input to the non-inverting input terminal + with the magnitude of a voltage input to the inverting input terminal-. When the magnitude of the voltage input to the non-inverting input terminal + is greater than the magnitude of the voltage input to the inverting input terminal –, a voltage input to the power terminal EN may be output. When the magnitude of the voltage input to the non-inverting input terminal + is smaller than the magnitude of the voltage input to the inverting input terminal −, a ground voltage may be output.

The power terminal EN may be supplied with the current supply signal Ci. While the current supply signal Ci of the turn-on level ON is applied, when the magnitude of the voltage input to the non-inverting input terminal + is greater than the magnitude of the voltage input to the inverting input terminal −, a signal of a high level H may be output from the output terminal. While the current supply signal Ci of the turn-on level ON is applied, when the magnitude of the voltage input to the non-inverting input terminal + is smaller than the magnitude of the voltage input to the inverting input terminal −, a signal of the ground voltage (or a low level L) may be output from the output terminal.

On the other hand, while the current supply signal Ci of the turn-off level OFF is applied, when the magnitude of the voltage input to the non-inverting input terminal + is smaller than the magnitude of the voltage input to the inverting input terminal −, a signal of the ground voltage (or the low level L) may be output from the output terminal.

The reference voltage Vref may be applied to the inverting input terminal −.

The first feedback voltage Vfb1 may be applied to the non-inverting input terminal +. The non-inverting input terminal + may be electrically connected to the input node Ni.

The output terminal may be configured to output a signal of the high level H or the low level L. The output terminal may be electrically connected to an S input terminal S of the SR latch 520.

The SR latch 520 can include the S input terminal S, an R input terminal R, and a Q output terminal Q.

The SR latch 520 is configured to store information based on signals input to the S input terminal S and the R input terminal R. The SR latch 520 operates according to a predetermined truth table, which is described in more detail below with reference to FIG. 6.

The S input terminal S can be connected to the output terminal of the comparator 510. The S input terminal S may correspond to a set terminal in the SR latch 520.

The R input terminal R can be connected to an output terminal of the second inverter INV2. A UVLO signal may be input to the second inverter INV2. The UVLO signal may refer to an Under Voltage Lock Out signal used in the art. The UVLO signal may transition from a low level to a high level when the display device 100 (see FIG. 1) starts to be driven. The R input terminal R may correspond to a reset terminal in the SR latch 520.

The Q output terminal Q may be configured to output the feedback control signal Cfb. The Q output terminal Q may be electrically connected to the control node Nc.

FIG. 6 is a truth table 600 of the SR latch 520 of FIG. 5. FIG. 6 shows the level of a signal output from the Q output terminal Q in response to the level of a signal input to each of the S input terminal S and the R input terminal R of the SR latch 520.

Referring to the truth table 600, when a signal of the low level L is input to the S input terminal S and a signal of the low level L is input to the R input terminal R, the Q output terminal Q can output a previously output signal as it is.

When a signal of the low level L is input to the S input terminal S and a signal of the high level H is input to the R input terminal R, the Q output terminal Q can output a signal of the low level L.

When a signal of the high level H is input to the S input terminal S and a signal of the low level L is input to the R input terminal R, the Q output terminal Q can output a signal of the high level H.

The case where a signal of the high level H is input to the S input terminal S and a signal of the high level H is input to the R input terminal R is not defined.

Figure 7A:
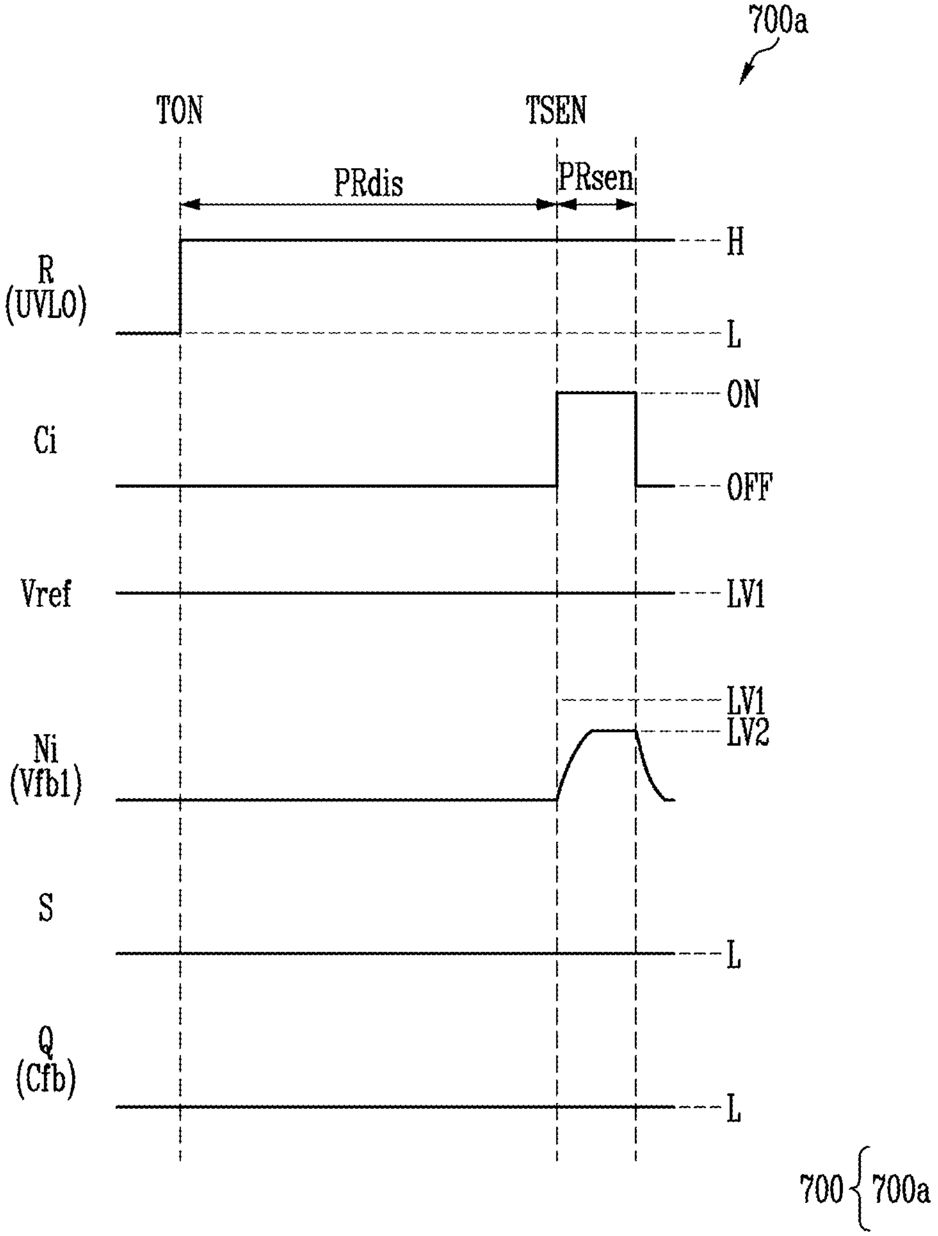
FIG. 7A is a timing diagram of a method of driving a power supply in a first case.
Figure 7B:
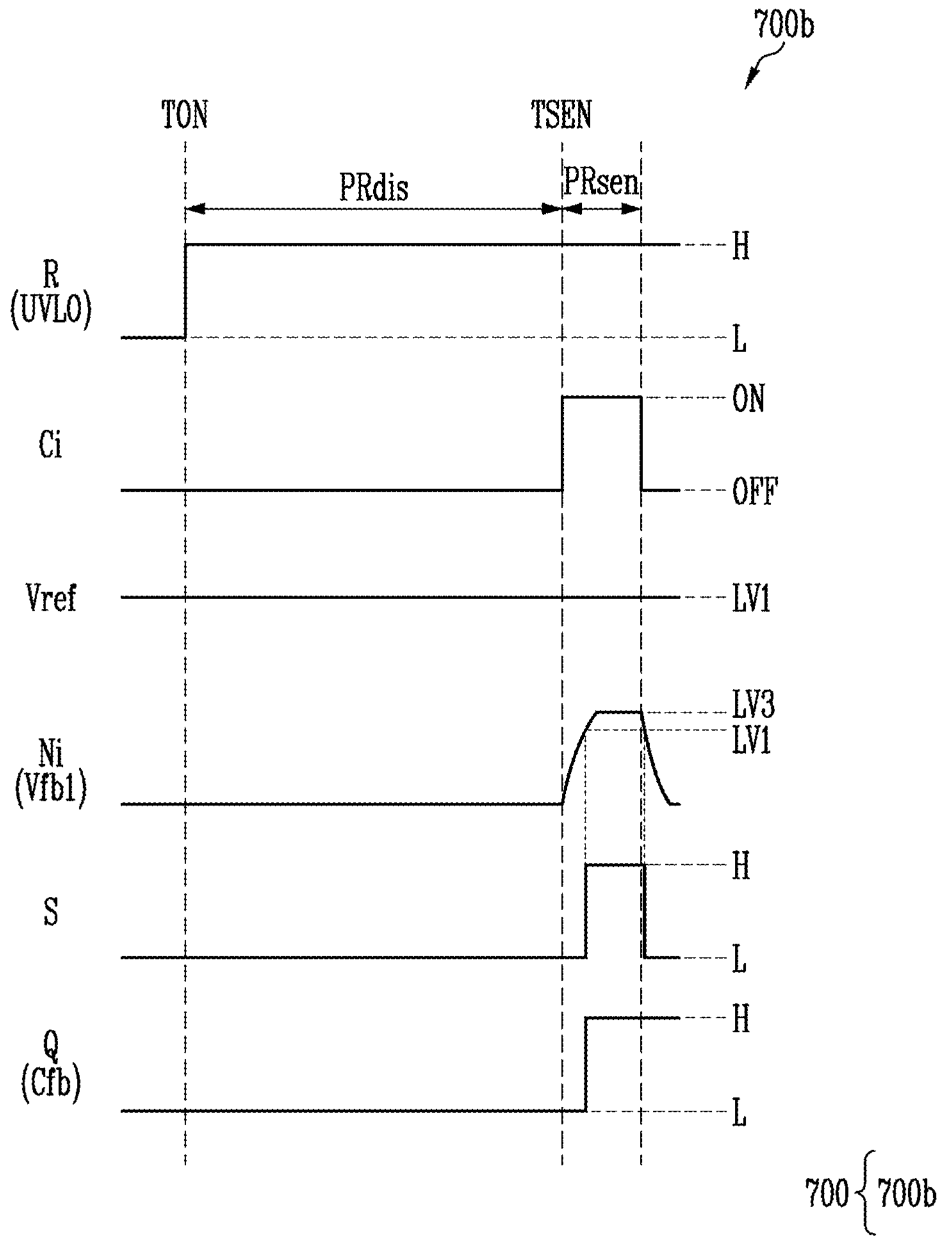
FIG. 7B is a timing diagram of a method of driving a power supply in a second case.

FIG. 7A is a timing diagram of a method 700*a* of driving the power supply 150 in a first case Case 1. FIG. 7B is a timing diagram of a method 700*b* of driving the power supply 150 in a second case Case 2.

Referring to FIGS. 3 to 6 described above together, a method 700 of driving the power supply 150 is be described. The method 700 of driving the power supply 150 may be divided into the driving method 700*a* of the power supply 150 in the first case and the driving method 700*b* of the power supply 150 in the second case.

Referring to FIGS. 7A and 7B, changes in voltage over time at each of the R input terminal R of the SR latch 520, the current supply signal Ci, the reference voltage Vref, the input node Ni, the S input terminal S of the SR latch 520, and the Q output terminal Q of the SR latch 520 are shown.

The UVLO signal may be input to the R input terminal R. The UVLO signal may transition from the low level L to the high level H at a first time point TON corresponding to a time point at which the display device 100 (see FIG. 1) starts to operate.

The current supply signal Ci may transition from the turn-off level OFF to the turn-on level ON at a second time point TSEN. The current supply signal Ci may remain at the turn-on level ON for a length of time corresponding to the sensing period PRsen from the second time point TSEN and transition to the turn-off level OFF at the end of the sensing period PRsen.

A period between the first time point TON, when the UVLO signal transitions to the high level H, and the second time point TSEN, when the current supply signal Ci transitions to the turn-on level ON, may be referred to as a discharge period PRdis. During the discharge period PRdis, an induced voltage may be discharged by at least one discharge transistor (e.g., the second internal transistor T2 of the internal voltage divider circuit 330).

The reference voltage Vref may have a voltage of a first level LV1 during the discharge period PRdis and the sensing period PRsen.

The first feedback voltage Vfb1 can be applied to the input node Ni. Hereinafter, the discharge period PRdis, the sensing period PRsen in the first case, and the sensing period PRsen in the second case are described separately with respect to the voltage at the input node Ni.

In the discharge period PRdis, the level of the voltage at the input node Ni may be lower than the first level LV1. Referring to FIG. 5 described above, the comparator 510 may output a signal of the low level L based on the result of comparing the voltage of the input node Ni with the reference voltage Vref. In the SR latch 520, a signal of the low level L is input to the S input terminal S and a signal of the low level L is input to the R input terminal R, and therefore the feedback control signal Cfb output through the Q output terminal Q is maintained at the low level L. Referring again to FIG. 3, in response to the feedback control signal Cfb of the low level L, the first internal transistor T1 of the internal voltage divider circuit 330 may be turned off, and the second internal transistor T2 of the internal voltage divider circuit 330 may be turned on. Thereby, the induced voltage remaining at the input node Ni may be discharged to the ground power source via the second internal transistor T2. Thereby, the induced voltage applied to the input node Ni during the discharge period PRdis may be discharged.

Referring to FIG. 7A, in the first case where the power supply 150 does not include an external voltage divider circuit, the voltage at the input node Ni may rise to a second level LV2 during the sensing period PRsen. The second level LV2 may be lower than the first level LV1. Referring to FIG. 5 described above, the comparator 510 may output a signal of the low level L based on the result of comparing the voltage of the input node Ni with the reference voltage Vref. In the SR latch 520, a signal of the low level L is input to the S input terminal S and a signal of the low level L is input to the R input terminal R, and therefore the feedback control signal Cfb output through the Q output terminal Q is maintained at the low level L. Referring again to FIG. 3, in response to the feedback control signal Cfb of the low level L, the first internal transistor T1 of the internal voltage divider circuit 330 may be turned off, and the second internal transistor T2 of the internal voltage divider circuit 330 may be turned on. Thereby, the first feedback voltage Vfb1 may be divided by the first internal resistor R1 and the second internal resistor R2 of the internal voltage divider circuit 330 into the second feedback voltage Vfb2, and the second feedback voltage Vfb2 may be input to the voltage controller 320. Accordingly, the output voltage Vout may be divided by the internal voltage divider circuit 330.

Referring to FIG. 7B, in the second case where the power supply 150 includes the external voltage divider circuit 220, the voltage at the input node Ni may rise to a third level LV3 during the sensing period PRsen. The third level LV3 may be higher than the first level LV1. Referring to FIG. 5 described above, the comparator 510 may output a signal of the high level H based on the result of comparing the voltage of the input node Ni with the reference voltage Vref. In the SR latch 520, a signal of the high level H is input to the S input terminal S and a signal of the low level L is input to the R input terminal R, and therefore the feedback control signal Cfb output through the Q output terminal Q transitions to the high level H. Referring again to FIG. 3, in response to the feedback control signal Cfb of the high level H, the first internal transistor T1 of the internal voltage divider circuit 330 may be turned on, and the second internal transistor T2 of the internal voltage divider circuit 330 may be turned off. Thereby, the first feedback voltage Vfb1 is not divided by the internal voltage divider circuit 330, and the second feedback voltage Vfb2 of the same magnitude as the first feedback voltage Vfb1 can be input to the voltage controller 320. Thus, the output voltage Vout may be divided by the external voltage divider circuit 220.

In both the first and second cases, because the potential of the input node Ni has been reduced to a ground potential during the preceding discharge period PRdis, whether an external voltage divider circuit is installed can be determined in a state where the influence of an induced voltage is minimized or eliminated.

Figure 8:
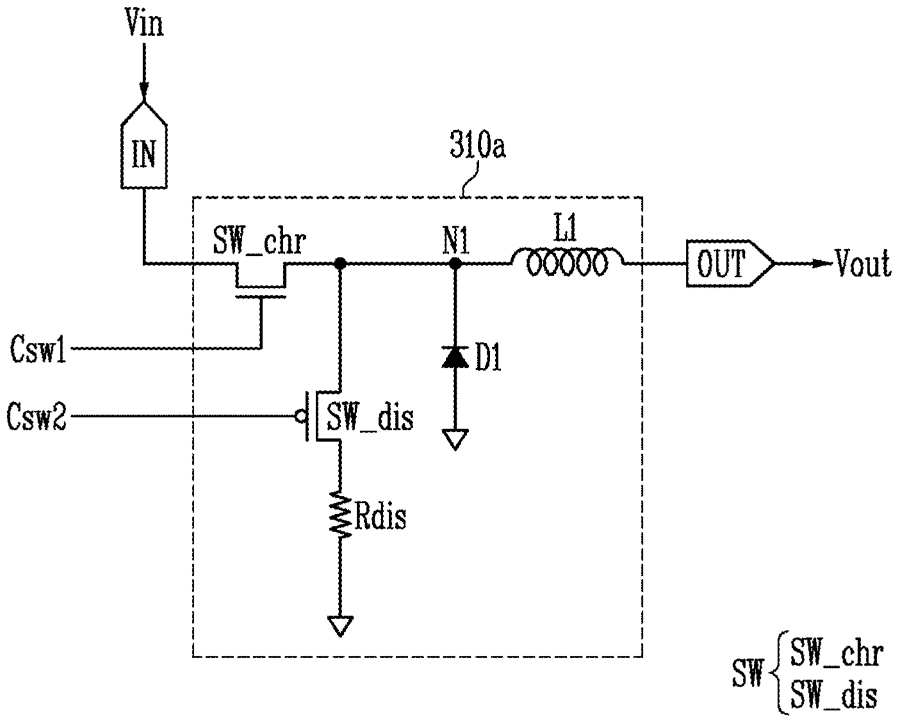
FIG. 8 illustrates an embodiment of a voltage conversion circuit.

FIG. 8 illustrates an embodiment of a voltage conversion circuit 310*a*.

The voltage conversion circuit 310*a* according to embodiments of the present disclosure may be a non-isolated converter.

Referring to FIG. 8, the voltage conversion circuit 310*a* according to embodiments of the present disclosure may include a charging transistor SW_chr, an inductor L1, and a diode D1. The charging transistor SW_chr, the inductor L1, and the diode D1 may constitute a buck converter. The voltage conversion circuit 310*a*, according to embodiments of the present disclosure, may further include a discharging transistor SW_dis and a resistor Rdis.

An on-off operation of the charging transistor SW_chr may be controlled by the first switching control signal Csw1. The charging transistor SW_chr may be implemented as a transistor. The charging transistor SW_chr may be connected between the input terminal IN and a first node N1.

The inductor L1 may be connected between the first node N1 and the output terminal OUT.

The diode D1 may be connected between the first node N1 and the ground power source. In the same sense, the diode D1 may be grounded.

The on-off operation of the discharging transistor SW_dis may be controlled by the second switching control signal Csw2. The discharging transistor SW_dis may be implemented as a transistor. The discharging transistor SW_dis may be connected between the first node N1 and the resistor Rdis. In an embodiment, the discharging transistor SW_dis may be grounded through the resistor Rdis. In embodiments of the present disclosure, the discharging transistor SW_dis may be referred to as a second discharge switching element SW_dis.

The resistor Rdis may be connected between the discharging transistor SW_dis and the ground power source.

In an embodiment, each of the charging transistor SW_chr and the discharging transistor SW_dis may be a Field Effect Transistor (FET). However, embodiments of the present disclosure are not limited thereto, for example, each of the charging transistor SW_chr and the discharging transistor SW_dis may be a Bipolar Junction Transistor (BJT), a Thin Film Transistor (TFT), or the like.

In an embodiment, the charging transistor SW_chr and the discharging transistor SW_dis may be different types of transistors. For example, the charging transistor SW_chr may be a transistor including an N-type semiconductor and the discharging transistor SW_dis may be a transistor including a P-type semiconductor. Alternatively, the charging transistor SW_chr may be a transistor including a P-type semiconductor and the discharging transistor SW_dis may be a transistor including an N-type semiconductor. However, embodiments of the present disclosure are not limited thereto, and the charging transistor SW_chr and the discharging transistor SW_dis may be transistors of the same type (e.g., transistors including the same type of semiconductor).

In embodiments of the present disclosure, the discharging transistor SW_dis may be configured to discharge the induced voltage applied to the first node N1 to a ground. When the discharging transistor SW_dis is turned on, the first node N1 may be grounded.

Figure 9:
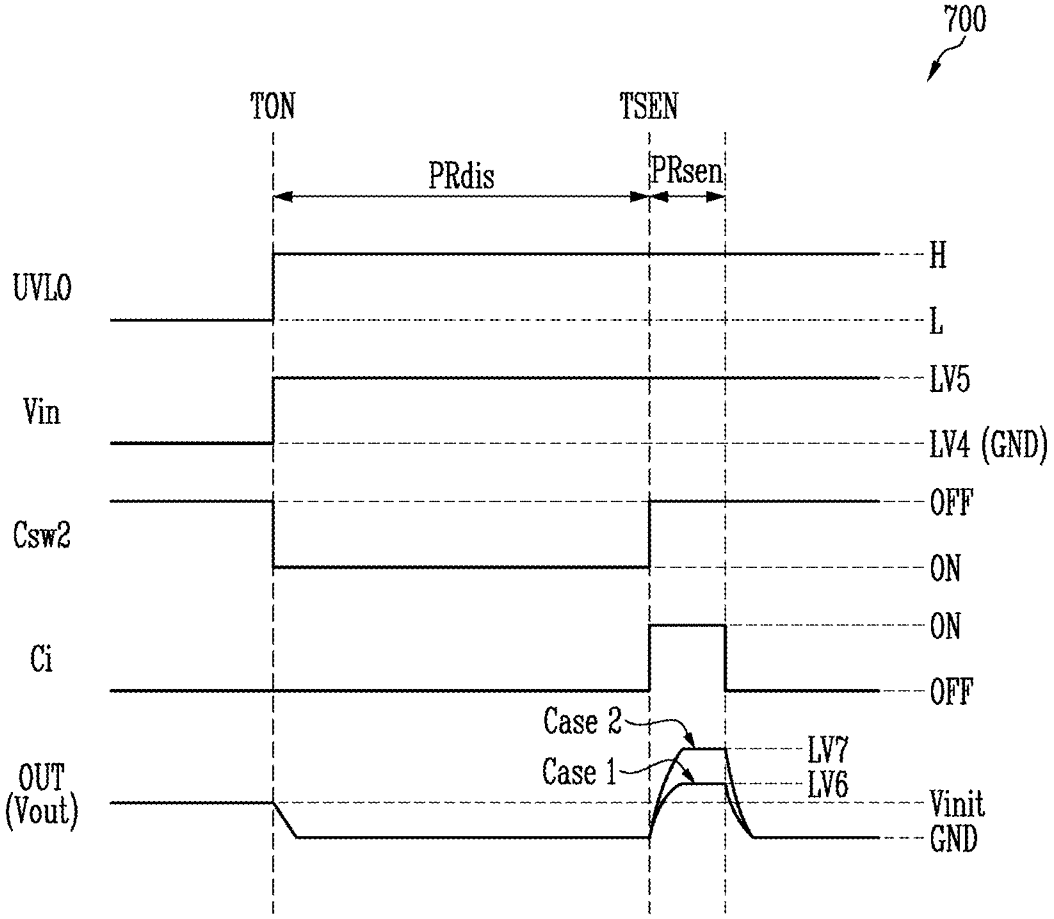
FIG. 9 is a timing diagram of a method of driving a power supply.

FIG. 9 is a timing diagram of the method 700 of driving the power supply 150.

Hereinafter, the method of driving the power supply 150 is described with further reference to FIG. 8 described above.

FIG. 9 shows the UVLO signal and the current supply signal Ci to define the first time point TON and the second time point TSEN, respectively. As described with reference to FIGS. 7A and 7B, the period between the first time point TON and the second time point TSEN may be referred to as the discharge period PRdis, and the period during which the current supply signal Ci has the turn-on level ON after the second time point TSEN may be referred to as the sensing period PRsen.

In the discharge period PRdis and the sensing period PRsen, the first switching control signal Csw1 (see FIG. 8) may have a turn-off level.

The voltage level of the input voltage Vin may transition from a fourth level LV4 to a fifth level LV5 at the first time point TON. The fourth level LV4 may be the ground potential. With respect to the UVLO signal, the time point at which the UVLO signal has the high level H may be the same as the time point at which the input voltage Vin begins to be supplied at a predetermined magnitude (e.g., the fifth level LV5). Thereby, a malfunction of an internal circuit of the power supply 150 (see FIG. 1) may be prevented or mitigated.

The second switching control signal Csw2 may have the turn-on level ON in the discharge period PRdis and the turn-off level OFF in the sensing period PRsen. Referring to FIG. 8 described above, the discharging transistor SW_dis may be turned on in the discharge period PRdis, and the voltage induced to the first node N1 may be discharged through the discharging transistor SW_dis.

The output terminal OUT may output the output voltage Vout. In the discharge period PRdis, as the voltage of the first node N1 is discharged, the output voltage Vout may have a ground potential GND. In the sensing period PRsen, as the current supply signal Ci of the turn-on level ON is supplied, the voltage level of the output voltage Vout may temporarily rise.

In the first case where the power supply 150 (see FIG. 1) does not include an external voltage divider circuit, the output voltage Vout may rise to a sixth level LV6.

In the second case where the power supply 150 includes an external voltage divider circuit, the output voltage Vout may rise to a seventh level LV7.

In both the first and second cases, because the potential of the output terminal OUT has been reduced to the ground potential GND during the preceding discharge period PRdis, whether an external voltage divider circuit is installed can be determined in a state where the influence of an induced voltage is minimized or eliminated.

Figure 10:
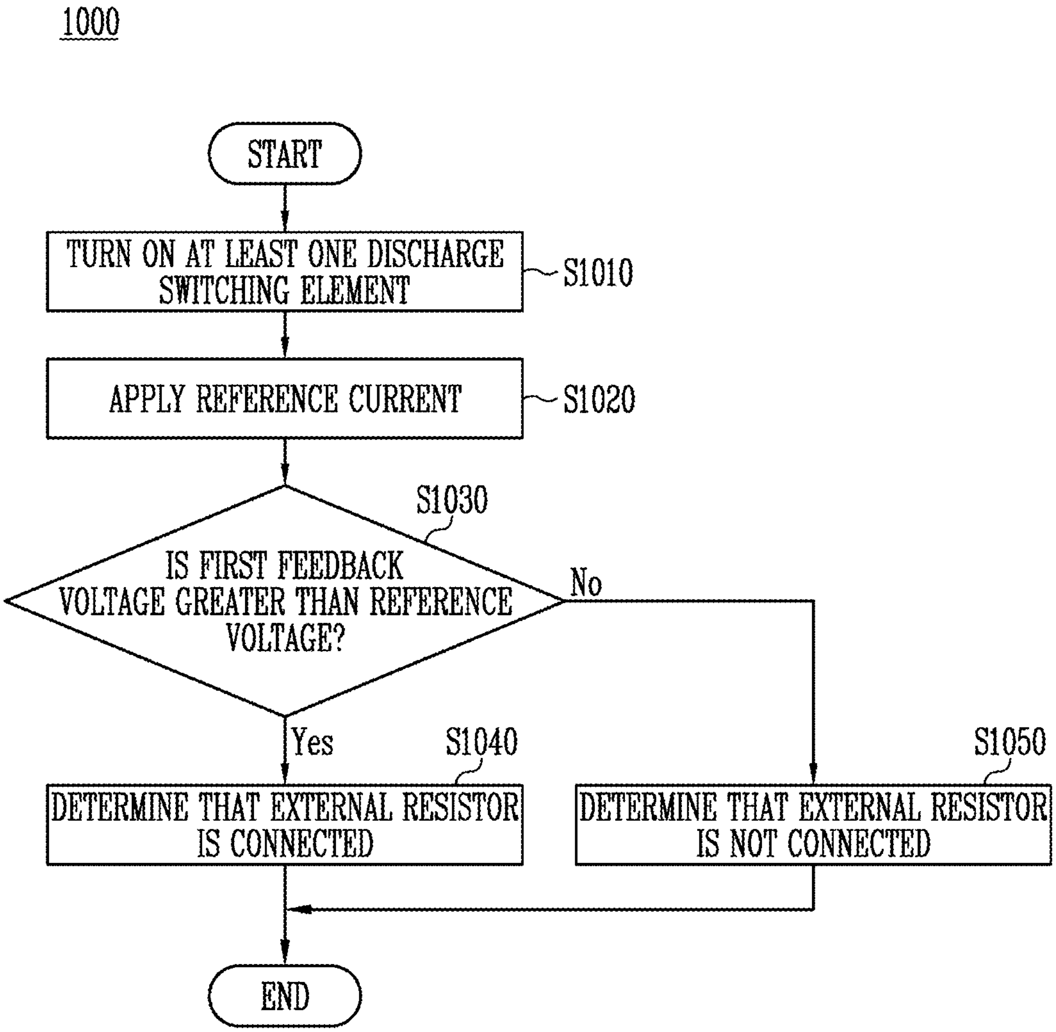
FIG. 10 is a flowchart of a method of driving a power supply according to embodiments of the present disclosure.

FIG. 10 is a flowchart of a driving method 1000 of a power supply according to embodiments of the present disclosure.

Referring to FIG. 10, the driving method 1000 of the power supply according to embodiments of the present disclosure may include step S1010 of turning on the at least one discharge switching element, step S1020 of applying a reference current, and step S1030 of determining whether a first feedback voltage is greater than a reference voltage. Depending on the result of determining whether the first feedback voltage is greater than the reference voltage, either step S1040 of determining that an external resistor is connected or step S1050 of determining that the external resistor is not connected may be performed.

In step S1010 of turning on at least one discharge switching element, at least one of the second internal transistor T2 (see FIG. 3) of the internal voltage divider circuit 330 (see FIG. 3) or the discharging transistor SW_dis (see FIG. 8) of the voltage conversion circuit 310 (see FIG. 3) described above may be turned on.

The display device 100 (see FIG. 1) according to an embodiment can be applied to various electronic devices DS (see FIG. 1). The electronic device DS according to an embodiment includes the display device 100 described above and may further include modules or devices having different additional functions in addition to the display device 100.

Figure 11:
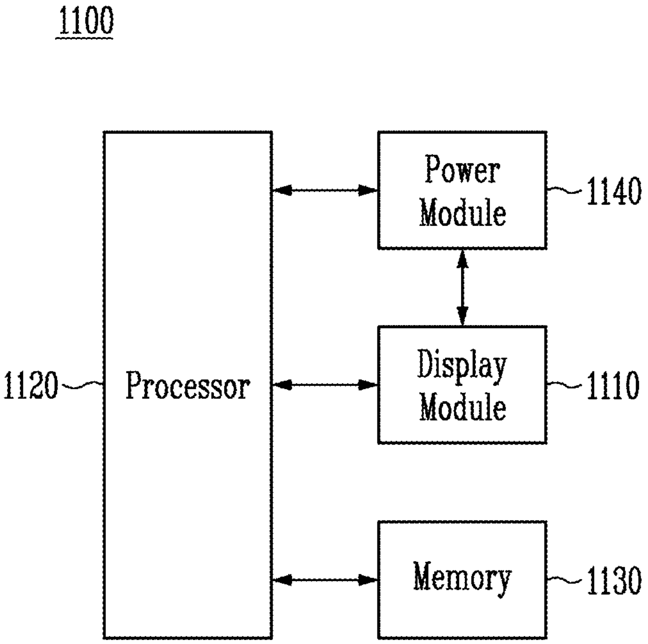
FIG. 11 is a block diagram of an electronic device according to an embodiment of the present disclosure.

FIG. 11 is a block diagram of an electronic device 1100 according to an embodiment of the present disclosure.

Referring to FIG. 11, the electronic device 1100 according to an embodiment may include a display module 1110, a processor 1120, a memory 1130, and a power module 1140.

The processor 1120 may include at least one of a central processing unit (CPU), an application processor (AP), a graphics processing unit (GPU), a communication processor (CP), an image signal processor (ISP), and a controller.

The memory 1130 may store data information required for an operation of the processor 1120 or the display module 1110. When the processor 1120 executes an application stored in the memory 1130, image data signals or input control signals are transferred to the display module 1110, and the display module 1110 may process the received signals to output image information through a display screen.

The power module 1140 can include a power supply module, such as a power adapter or a battery device, and a power conversion module that converts the power supplied by the power supply module to generate the power required for an operation of the electronic device 1100.

At least one of the above-described components of the electronic device 1100 may be included in the display device 100 (see FIG. 1) according to the above-described embodiments. Additionally, one or more of individual modules that are functionally included in one module may be included in the display device 100 and individual modules other than the one or more of the individual modules may be provided separately from the display device 100. For example, the display device 100 may include a display module 1110, while the processor 1120, the memory 1130, and the power module 1140 may be provided in the form of other devices in the electronic device 1100 other than the display device.

In an embodiment, the power module 1140 according to embodiments of the present disclosure may include the power supply 150 (see FIG. 1) described above.

In an embodiment, the power module 1140 according to embodiments of the present disclosure may include the power unit 160 described above. In another embodiment, the display module 1110 according to embodiments of the present disclosure may include the power unit 160.

In an embodiment, signals for controlling the power supply 150 (see FIG. 1) according to embodiments of the present disclosure (e.g., the second switching control signal Csw2 (see FIG. 3), the UVLO signal (see FIG. 5), or the like) may be output from the processor 1120, or may be output within the display module 1110.

In an embodiment, the processor 1120 according to embodiments of the present disclosure may include the host 170 described above (see FIG. 1).

Figure 12:
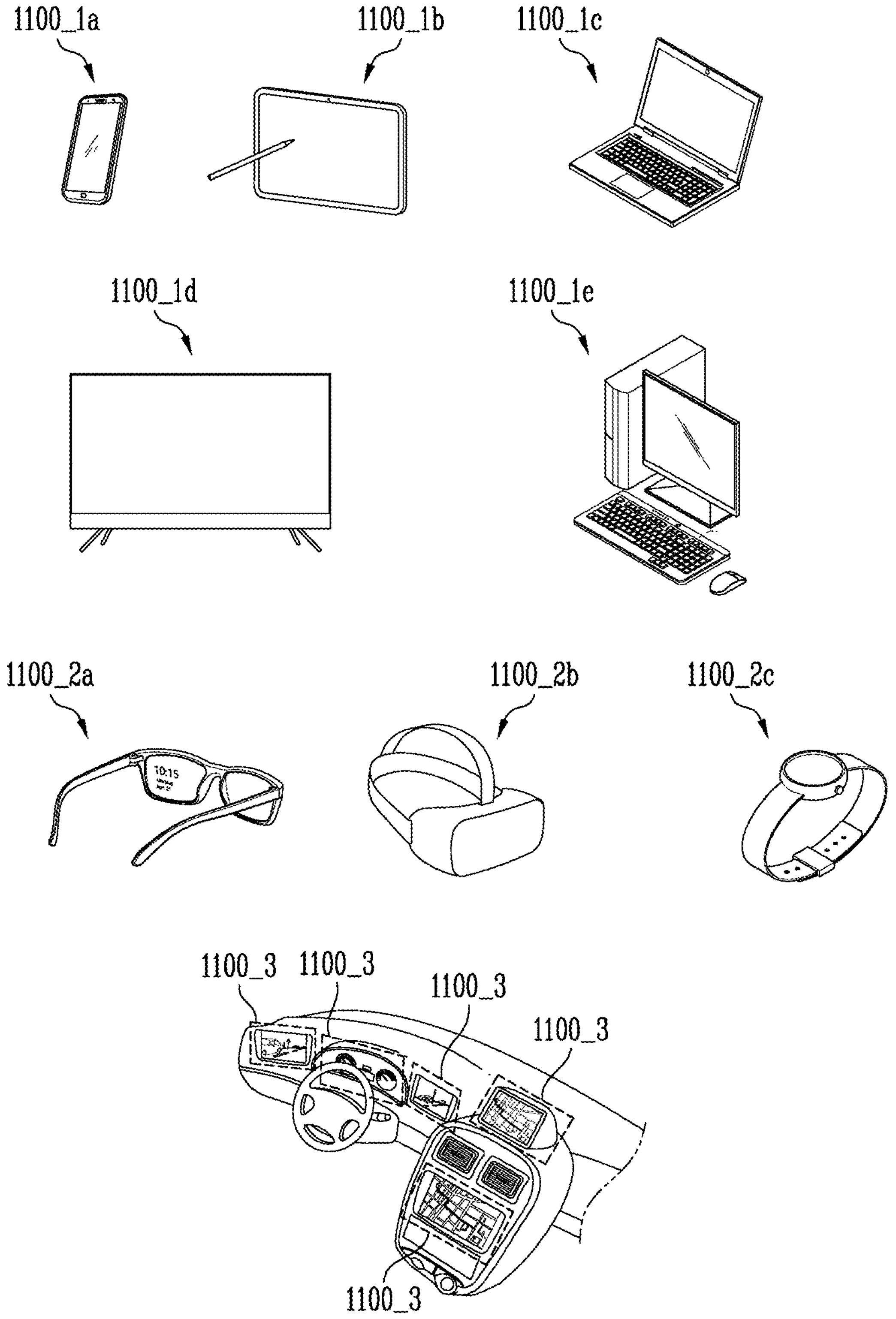
FIG. 12 shows schematic diagrams of electronic devices according to various embodiments of the present disclosure.

FIG. 12 shows schematic diagrams of electronic devices according to various embodiments of the present disclosure.

Referring to FIG. 12, examples of various electronic devices to which a display device according to embodiments of the present disclosure may include electronic devices for displaying images, such as a smartphone 1100_1*a*, a tablet PC 1100_1*b*, a laptop 1100_1*c*, a television 1100_1*d*, or a desk monitor 1100_1*e*, as well as wearable electronic devices including display modules such as smart glasses 1100_2*a*, a head-mounted display 1100_2*b*, or a smart watch 1100_2*c*, and automotive electronic devices 1100_3 including display modules such as an automotive dashboard, a center fascia, a Center Information Display (CID) placed on a dashboard, or a room mirror display.

In a power supply, an electronic device including the same, and a method of driving the same according to embodiments of the present disclosure, an induced voltage may be removed.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A power supply, comprising:

an output terminal to output an output voltage;

a voltage conversion circuit configured to generate the output voltage corresponding to a duty ratio of a first switching control signal;

a feedback terminal electrically connected to the output terminal and electrically connected to an input node to which a first feedback voltage is applied;

a current supply configured to provide a reference current to the input node in response to a current supply signal of a turn-on level which is input during a sensing period;

a comparison unit configured to compare a voltage applied to the input node with a reference voltage, to output a feedback control signal of a first level during a discharge period preceding the sensing period, and to output the feedback control signal of the first level or a second level during the sensing period;

an internal voltage divider circuit configured to electrically connect the input node and a ground power source in response to the feedback control signal of the first level, and to divide the first feedback voltage into a second feedback voltage in response to the feedback control signal of the first level; and a voltage controller configured to adjust the duty ratio of the first switching control signal in response to the second feedback voltage.

2. The power supply according to claim 1, wherein the current supply includes:

a current source connected to a driving power and configured to generate the reference current; and a control transistor connected between the current source and the input node and controlled in response to the current supply signal.

3. The power supply according to claim 2, wherein the control transistor includes an N-type semiconductor.

4. The power supply according to claim 2, wherein the reference current is 1 mA.

5. The power supply according to claim 1, wherein the internal voltage divider circuit includes:

a first resistor connected between the input node and the voltage controller;

a first internal transistor connected between the input node and the voltage controller, and turned on in response to the feedback control signal of the second level;

a second resistor; and a second internal transistor, wherein the second resistor and the second internal transistor are connected in series between the input node and the ground power source, and wherein the second internal transistor is turned on alternately to the first internal transistor.

6. The power supply according to claim 5, wherein the internal voltage divider circuit further includes a first inverter configured to invert a phase of the feedback control signal, and wherein the second internal transistor includes a gate electrode electrically connected to an output terminal of the first inverter.

7. The power supply according to claim 5, wherein each of the first internal transistor and the second internal transistor includes an N-type semiconductor.

8. The power supply according to claim 5, wherein the first internal transistor includes an N-type semiconductor, and the second internal transistor includes a P-type semiconductor.

9. The power supply according to claim 1, wherein the comparison unit includes:

a comparator that includes a power terminal to which the current supply signal is input, and that outputs a signal of a low level or a high level based on a result of comparing the reference voltage with the first feedback voltage;

a second inverter configured to invert a phase of an Under Voltage Lock Out (UVLO) signal; and an SR latch including:

an S input terminal electrically connected to an output terminal of the comparator;

an R input terminal electrically connected to an output terminal of the second inverter; and a Q output terminal that outputs the feedback control signal according to a predetermined truth table based on a result of comparing an input to the S input terminal with an input to the R input terminal.

10. The power supply according to claim 9, wherein the comparator includes:

an inverting input terminal supplied with the reference voltage; and a non-inverting input terminal supplied with the first feedback voltage.

11. The power supply according to claim 10, wherein the comparator outputs the signal of the low level during the discharge period during which the current supply signal of a turn-off level is supplied.

12. The power supply according to claim 10, wherein the comparator outputs, during the sensing period during which the current supply signal of the turn-on level is supplied:

the signal of the low level when the first feedback voltage is smaller than the reference voltage; and the signal of the high level when the first feedback voltage is greater than the reference voltage.

13. The power supply according to claim 1, wherein the voltage conversion circuit includes:

a charging transistor connected between a first node and an input terminal, to which an input voltage is input, and controlled in response to the first switching control signal;

a resistor connected to the ground power source;

a discharging transistor connected between the first node and the resistor and controlled in response to a second switching control signal;

a diode connected between the first node and the ground power source; and an inductor connected between the first node and the output terminal.

14. The power supply according to claim 13, wherein the second switching control signal has the turn-on level during the discharge period, and has a turn-off level during the sensing period.

15. The power supply according to claim 13, wherein the first switching control signal has a turn-off level during the discharge period and the sensing period.

16. The power supply according to claim 13, further comprising an external voltage divider circuit connected to the input terminal and the output terminal and including a plurality of external resistors.

17. The power supply according to claim 16, wherein the external voltage divider circuit includes:

a first external resistor connected between the output terminal and the feedback terminal; and a second external resistor connected between the first external resistor and the ground power source.

18. A method of driving a power supply, the method comprising:

turning on, during a discharge period, a first discharge switching element electrically connected to a feedback terminal;

applying, during a sensing period after the discharge period, a reference current to an input node electrically connected to the feedback terminal;

comparing a first feedback voltage of the input node with a reference voltage; and determining whether an external resistor is connected to the feedback terminal according to a result of comparing the first feedback voltage of the input node with the reference voltage.

19. The method according to claim 18, further comprising turning on, during the discharge period, a second discharge switching element electrically connected to an output terminal, wherein the feedback terminal and the output terminal are electrically connected to each other.

20. An electronic device, comprising:

a power supply converting an input voltage to generate a plurality of output voltages;

a data driver receiving one of the plurality of output voltages and generating a data voltage;

a scan driver receiving one of the plurality of output voltages and generating a scan signal; and a display panel in which a plurality of pixels, to which the data voltage and the scan signal are applied, are arranged, wherein the power supply includes:

an output terminal to output an output voltage of the plurality of output voltages;

a voltage conversion circuit configured to generate the output voltage corresponding to a duty ratio of a first switching control signal;

a feedback terminal electrically connected to the output terminal and electrically connected to an input node to which a first feedback voltage is applied;

a current supply configured to provide a reference current to the input node in response to a current supply signal of a turn-on level which is input during a sensing period;

a comparison unit configured to compare a voltage applied to the input node with a reference voltage, to output a feedback control signal of a first level during a discharge period preceding the sensing period, and to output the feedback control signal of the first level or a second level during the sensing period;

an internal voltage divider circuit configured to electrically connect the input node and a ground power source in response to the feedback control signal of the first level, and to divide the first feedback voltage into a second feedback voltage in response to the feedback control signal of the first level; and a voltage controller configured to adjust the duty ratio of the first switching control signal in response to the second feedback voltage.

* * * * *